United States Patent [19]

Wilson et al.

[11] Patent Number: 4,532,804

[45] Date of Patent: Aug. 6, 1985

[54] DEVICE FOR RETAINING A TOOL IN EITHER A STATIONARY OR MOVABLE POSITION

[75] Inventors: Louis D. Wilson; Patrick M. Jones, both of Folsom, Calif.

[73] Assignee: Drive Line Service, Inc., West Sacramento, Calif.

[21] Appl. No.: 568,926

[22] Filed: Jan. 6, 1984

[51] Int. Cl.³ .................... G01M 1/04; G01M 1/16
[52] U.S. Cl. ................................................ 73/478
[58] Field of Search .................... 73/466, 474, 478; 384/126, 617, 614; 308/189 R; 269/57, 81

[56] References Cited

U.S. PATENT DOCUMENTS

| 2,043,618 | 6/1936 | Havill | 73/466 |
| 2,130,122 | 9/1938 | Dybvig | 73/478 X |
| 4,009,612 | 3/1977 | Johnson | 73/480 |

Primary Examiner—Jerry W. Myracle
Assistant Examiner—John E. Chapman, Jr.
Attorney, Agent, or Firm—Mark C. Jacobs

[57] ABSTRACT

A device for retaining a workpiece in either a stationary or movable position for use in a machine which incorporates an off-balance indicator such as a strobe light and which is used to remove imbalance. The device selectively holds the tool in a first fixed stationary position for performing work operations thereon or releases the tool to allow it to oscillate so as to enable balancing operations to be carried out.

6 Claims, 9 Drawing Figures

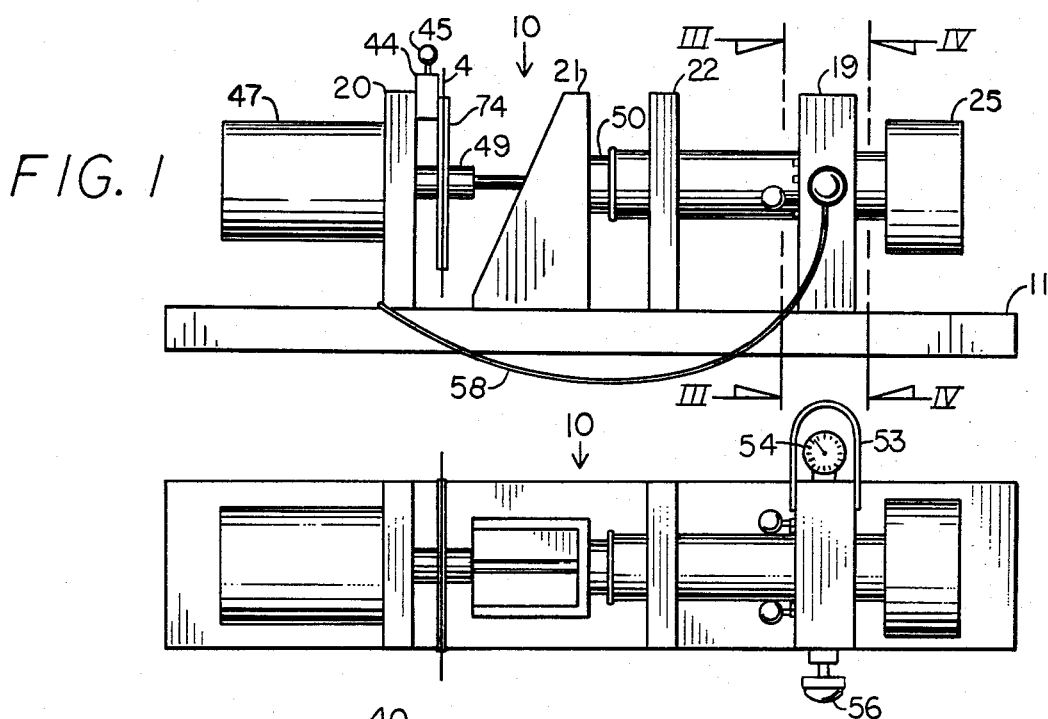
FIG. 1
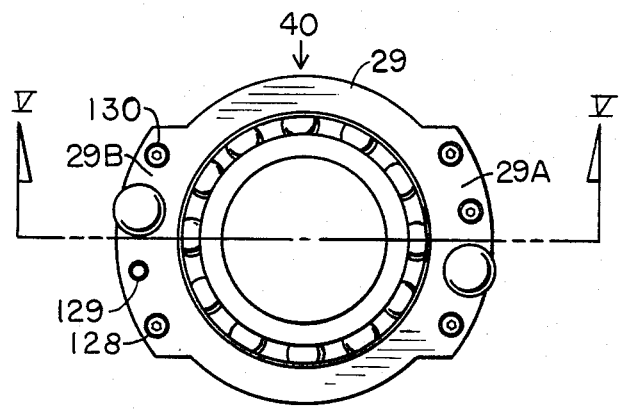
FIG. 2
FIG. 3
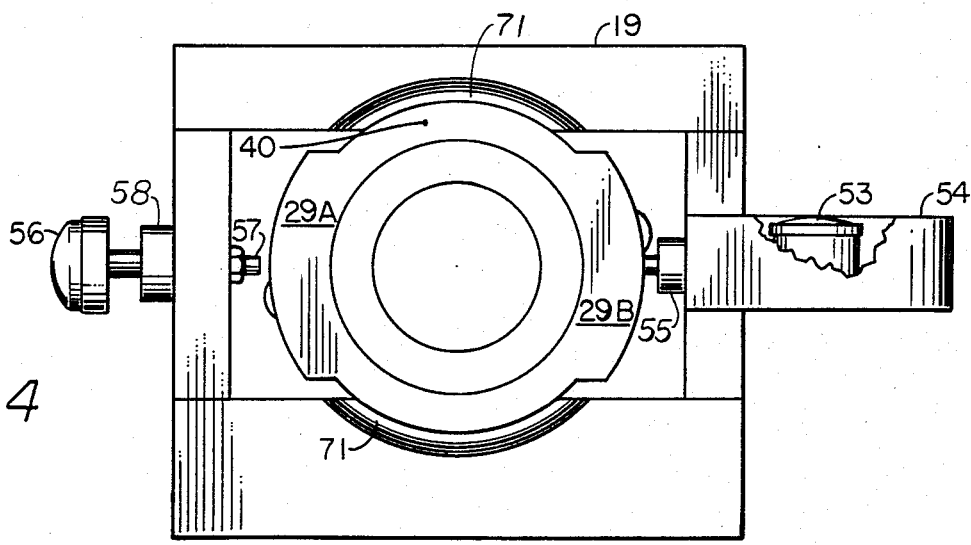
FIG. 4

DEVICE FOR RETAINING A TOOL IN EITHER A STATIONARY OR MOVABLE POSITION

BACKGROUND OF THE INVENTION

1. Field of the Invention

The invention relates to machines; and, more particularly, to a device for retaining a tool or workpiece in either a stationary or movable position for utilization in a balancing machine.

2. Description of the Prior Art

In U.S. Pat. No. 3,758,098, there is disclosed a machine for performing various operations on drive shafts. In one of the embodiments of said patent there is disclosed a means for providing a balancer on the same machine to indicate if a drive shaft was out of balance thereby permitting use of conventional balancing techniques to bring the shaft within desired balance limits on the same machine. Although no particular balancer was described in the patent, there is a need for such a device on such machines which is adapted, in one position, to hold a drive shaft firmly in position on the machine so that the operations described in that patent can be carried out. After such operations, the shaft should be able to be balanced by using the same device which held the shaft in the first position. This is not true of the machine in that patent nor of any such machine known to exist in the prior art. Such a device can be used to carry out other work operations and need not be part of any particular type of work station. In other words, such a device may be used in other environments to hold a tool or workpiece in either a fixed stationary position or allow it to oscillate or rock to detect the balancing thereof.

SUMMARY OF THE INVENTION

It is an object of this invention to provide a device for holding a tool or workpiece in either a rigid fixed position or in position where it moves or oscillates.

It is a further object of this invention to provide such a device which can be incorporated into a machine that performs the functions of U.S. Pat. No. 3,758,098.

It is still another object of the invention to provide such a device which can be coupled to a suitable strobe apparatus for balancing a tool or workpiece.

These and other objects are preferably accomplished by providing a device which can hold a tool in a first fixed stationary position for carrying out work operations thereon, then can release the tool to allow it to move or oscillate to detect the balance or unbalance thereof. A strobe light may be coupled to the device for balancing the tool. The apparatus may be employed in a machine adapted for balancing various types of workpieces.

The invention accordingly comprises the apparatus possessing the construction, combination or elements and arrangement of parts which are exemplified in the following detailed disclosure, and the scope of the application of which will be indicated in the claims.

RELATIONSHIP TO OTHER APPLICATIONS

A machine adapted to incorporate the device of this invention is copending in the names of Louis D. Wilson and Patrick Jones, Ser. No. 536,358, filed Sept. 27, 1983 and entitled "Balance Work Support and Chuck".

BRIEF DESCRIPTION OF THE DRAWINGS

FIG. 1 is a side elevational view of an apparatus that employs the device of this invention;

FIG. 2 is a top plan view of the apparatus of FIG. 1;

FIG. 3 is a rear elevational view of a portion of the instant invention;

FIG. 4 is a front elevational view of the device of this invention with the socket chuck removed therefrom for convenience of illustration;

DESCRIPTION OF THE PREFERRED EMBODIMENT

Figure 5:
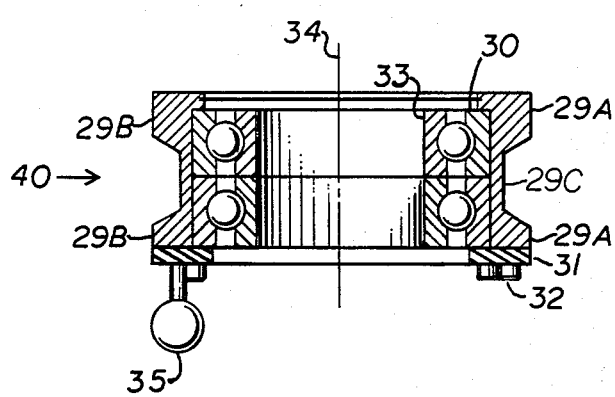
FIG. 5 is a cross section view device in FIG. 4.

Referring now to FIG. 1 and FIG. 2 of the drawing, apparatus 10 is shown for carrying out the invention. Apparatus 10 includes a base 11 having an upstanding self-aligning bearing member 22. As particularly contemplated in the invention, a locking and dynamic balancing apparatus 19 is provided on base 11 spaced from member 22. An upstanding flange member 20 is spaced from bracket 21. A socket chuck 25 may be provided extending through bearing member 22 and locking and balancing apparatus 19. As will be discussed, in place of chuck 25, any suitable tool or workpiece may be provided.

Referring now to FIGS. 3, 4, and 5, there is an assembly 40 held within support member 19 which contains a rotatable outer shell or drum 29 which acts as a holder for conventional ball bearings 30 held in place by a retainer ring 31 attached to the shell by use of conventional bolt 32. The ball bearings 30 allow the work piece to rotate by carrying load on the inner race 33 of the ball bearings. The inner race 33 is sized relative to the shaft of the work piece to additionally allow motion to occur along the axis of the bearing 34. This feature accommodates rotary motions while allowing freedom of axial motion. The axial motion is used with the outer shell 29 in the locked position to accommodate work piece assembly operations which utilize both rotational and axial motion.

Figure 6A:
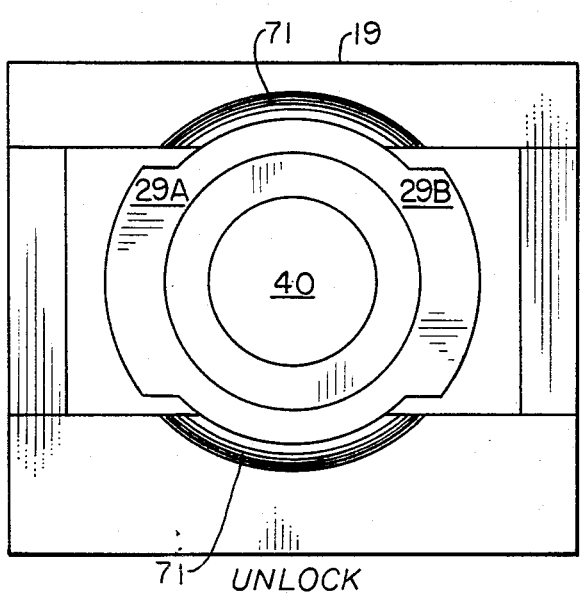
FIGS. 6A and 6B are diagrammatic front view of the device of this invention in its two operating positions.
Figure 6B:
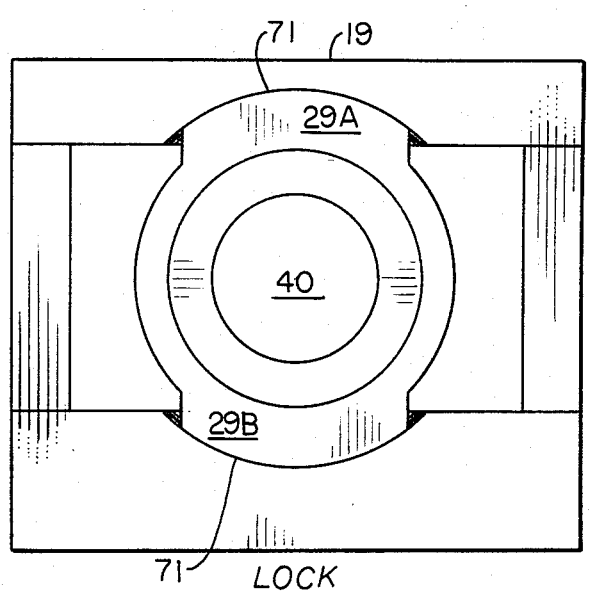

Referring to FIG. 3, it is seen that the outer shell 29 has concentric lobes 29A, 29B which engage an arcuate recessed zone both in front and behind support 51 the front zone being, designated 71, which is seen in FIG. 6B to hold the assembly in a neutral locked position. When rotated ninety degrees (90°) by use of knobs 35 for that purpose, the lobes 29A, 29B of shell 29 disengage from the recessed zones 71 as per FIG. 6A thereby allowing the shell to be supported on portion 29C only by support piece 51 per FIG. 7. When in this position lateral motion is restrained only by gravity force. Unbalance force generated by rotational velocity causes the geometric axis to follow the rotational axis, giving a display of unbalance, as for example on the numeric indicator 74 of FIG. 1, said imbalance being illustrated in FIG. 8. Note that while 29C extends 360°, lobes 29A and 29B are arcs of a large diameter circle than shell portion 29c.

Flange member 20 on base 11 includes a strobe light device 44 (FIGS. 1 and 2) and operating handle 45 therefor, and a conventional motor 47 for rotating the workpiece or chuck 25. Of course, suitable controls for operating machine 47 and light device 44 may be provided.

The work piece holder 25 extends through members 19,22 and into engagement with a collar 49 in operative engagement with a lighted clock position device 44. Suitable thrust pads 50 may be provided as on bracket 21. In the copending application filed concurrently with this application, the teachings of which are incorporated herein by reference, we disclose apparatus for using apparatus similar to 19 and the equipment associated therewith to work on workpieces such as drive shafts. Thus, a drive shaft in that application may be supported by spaced chucks 25 between a pair of apparatuses similar to 19. However, apparatus 19 and similar can be used in other operations and in such operations may be used to hold a workpiece or tool, such as chuck 25, in a first fixed stationary position or allow the tool to oscillate or float to determine its degree of balance or unbalance. A single apparatus 10, as illustrated in FIG. 1, may be used or mating apparatuses 10 retaining the tool or workpiece therebetween may be used.

Figure 7:
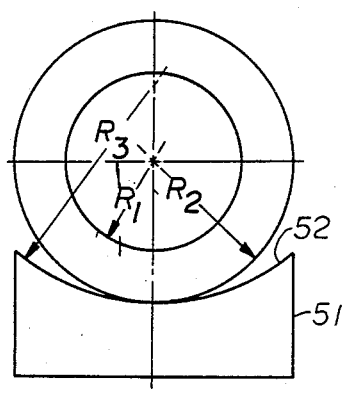
FIG. 7 and FIG. 8 are schematic views illustrating the operating principle of the instant apparatus.

Thus, as heretofore described with respect to FIGS. 3 through 5, each apparatus 19 includes an outer shell or drum 29 shown schematically in FIG. 7. The support piece 51 of cage 40 (FIG. 7) is curved at 52 as shown to provide a rocker surface for outer drum 29, the drum having a diameter concentric to the center line of the bearing 30. In FIG. 7, $R_1$ is the radius of inner rotating race of bearing 30, $R_2$ is the radius of the bearing cage assembly 40 and shell 29C and $R_3$ is the radius of curvature of the curved rocker surface 52. This design provides a display of any unbalance to a workpiece extending through bearing 30 or otherwise supported thereby. The amount of motion, and the location thereof, can be measured so that corrective steps can be taken to eliminate any unbalance. Spaced apertures 128 receive shafts 129 and retain them by nuts 130.

Thus the housing assembly 40 has a geometric and mass center, when rotation of the work space occurs. When the mass and geometric centers are closely coincident, there is an absence of oscillatory motion at a frequency coincident with rotational speed. When significant departures of the geometric and mass centers occur, unbalance forces are generated which cause a following motion to occur. The magnitude of force generated is a function of mass unbalance and the speed, squared. Because of the speed squared relationship, dynamic (rotational) balance is extremely important in all machinery and vehicles. High loads and resultant distress is imparted by the unbalanced rotational member to support bearings and fixtures resulting in excessive wear, distress, and, in many cases, operator discomfort. Because of this fact, it is important to test many rotational members for the presence of unbalance and to provide a means of verifying the fact that corrective steps have been effective.

The rocker bearing support system provided at each member 19 is a novel means for displaying unbalance forces in the form of motion. The rocker bearing support concept uses a conventional ball bearing 30 to support the rotational member 25. The outer races of the double row ball bearings are held in a cage assembly 29. The outer diameter of the cage assembly 40 having shell 29C is supported by an arcuate support having a radius of curvature greater than that of shell 29C. The center of curvature of the support is displaced from the center of the rotational member and cage. This is shown schematically in FIG. 7 wherein the center of radius $R_3$ is shown displaced from the radius centers, lying on a vertical centerline.

These two different radius centers $R_2$ and $R_3$ in effect produce a device that seeks a neutral position through the operation of gravity forces, while letting the bearing cage assembly 40 react to motion imparted by unbalance forces exceeding the force of gravity on the workpiece being balanced. As rotational speed is imparted, a following motion is produced at the rocker bearing support 51 by use of the rocker bearing support 51 in conjunction with a hinged or other support 22 which is comprised of self-aligning bearings (not seen) which bearings allow controlled oscillatory motion.

Figure 8:
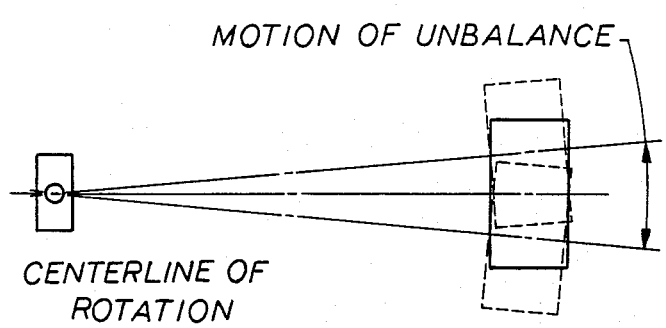

Thus, as shown schematically in FIG. 8, in the horizontal plane the unbalanced workpiece (held in device 19 along the centerline of rotation) provides displacement of the assembly 40 as shown. That is, the normal solid line position shows the drums in the assembly at rest; the dotted line position shows the motion of the drums due to an unbalanced workpiece. The sensitivity to the amount of unbalance may be varied by changing the relationship of the curvatures of the shell 29C and seat 52. Also, the total weight of the workpiece being tested for unbalance has no effect on the principle of operation. The apparatus may be proportioned to handle any size of rotating device that might be conceivably tested.

The arrangement disclosed has virtually unlimited load carrying capability and yet can still maintain sufficient sensitivity to produce an adequate balance to the workpiece.

As seen in FIG. 4 a meter 53 is provided on each apparatus 19 secured by a bracket 54 to cage assembly. A probe 55 is coupled to each meter 53. A knob 56 is also provided on the other side of bearing cage assembly 40 having a probe 57 extending through an opening in cage assembly 40 into contact with the outer shell.

The probe 57 is coupled via electrical conduit 58 (FIG. 1) to strobe light 44 to give an indication of where the unbalance motion is on ring assembly 40. That is, knobs 56 are rotated to move probes 57 into contact with shell 29. When the workpiece is rotated and, if unbalanced, motion is transmitted as illustrated in FIG. 8. Electrical circuit impulses are transmitted to the strobe light 44 to indicate the location of unbalance. This, as is well known in the art, tells the operator what clock position on the workpiece requires compensating balancing work.

Probe 55 also engages the exterior of shell 29 and measurements, via meter 53, are made of the amount of deflection.

Thus, a workpiece can, in a first position, be mounted in the apparatus 19 and locked in position. After performing any machining operations the drums are rotated ninety degrees (90°) by use of a hand knob, thus unlocking the workpiece. At this time, any balancing work necessary may be carried out. The unique arrangement allows a workpiece to be worked on with minimum time and effort utilizing a single work station. The set up time is appreciably less than in known prior art arrangements using commercial balancers and all balancing is carried out on the workpiece in the exact manner as it may be operated when in use, such as a vehicle drive shaft.

The shell 29 allows rotation and motion of the workpiece carried in inner bearing 30 (which in turn is seated in a shell 29 of larger radius) to follow motion imparted by any unbalance of the workpiece so that it rocks to and fro until neutralized. By the operator adding weights to the workpiece, as indicated by the strobe light position, as by welding, the workpiece can be balanced. The size of apparatus 19 may be varied to accommodate any size of tool or workpiece.

It can be seen that we have disclosed a machine and apparatus for selectively holding a tool or workpiece in either a fixed position or in a position in which it can rock or oscillate to determine the degree of balance or unbalance thereof. This significantly reduces the labor costs and capital costs for hardware employed in such industries as the balancing of drive shafts for trucks and cars.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A locking and dynamic balancing assembly comprising a rotatable annular shell and a rocker bearing support for said rotatable shell;

said support comprising a pair of spaced elongated upper and lower members interconnected at their ends, the lower elongated member having a central curved support section with a rocker surface adapted to receive said annular shell, and having a pair of similar arcuate recessed zones of a different radius of curvature from said support section disposed forwardly and rearwardly of said support section;

said rotatable annular shell disposed within said rocker bearing support, within which shell is an inner race carrying a plurality of ball bearings, said shell having a pair of spaced arcuate concentric lobes extending outwardly on opposite sides of the outer surface of said shell, said lobes being rotatable from a first position to a second position, the radius of said annular shell being designated $R_2$ and the central support section of the lower member of the rocker bearing support having a radius of curvature $R_3$ which is greater than $R_2$, the radius of said lobes corresponding to the radius of curvature of said recessed zones;

whereby when said lobes are rotated such that the annular shell is in an unlocked position, the outer surface of said annular shell rests on the curved central support section of the lower member of the rocker bearing support, and is restrained only by gravity force;

and when said lobes are rotated to a locked position, the lobes are engaged in both the upper and lower elongated member's arcuate recessed zones.

2. The assembly of claim 1 including strobe means coupled to said assembly for determining the movement of the central longitudinal axis of said shell when said shell is unlocked for oscillation, and first probe means coupled to said strobe means adapted to engage a workpiece or tool held within said shell to transmit changes in coincidence of the central longitudinal axis of said shell when both stationary and unlocked for oscillation to said strobe means.

3. The assembly of claim 2 wherein said strobe means is a strobe light electrically coupled to said first probe means.

4. The assembly of claim 2 including second probe means on said drum shell to register the degree of oscillation of said tool or workpiece.

5. The assembly of claim 4 wherein said second probe is a meter or readout.

6. The assembly of claim 1 comprising:
a base,
a self aligning bearing member mounted on said base,
and the rocker bearing support mounted on said base and spaced from said self aligning bearing member.

* * * * *